(12) United States Patent
Lie

(10) Patent No.: US 6,956,354 B2
(45) Date of Patent: Oct. 18, 2005

(54) BATTERY CHARGER

(75) Inventor: Sen Nen Lie, Hong Kong (HK)

(73) Assignee: Kolvin Industries Ltd., Kowloon (HK)

( * ) Notice: Subject to any disclaimer, the term of this patent is extended or adjusted under 35 U.S.C. 154(b) by 0 days.

(21) Appl. No.: 10/453,110

(22) Filed: Jun. 2, 2003

(65) Prior Publication Data
US 2004/0239292 A1 Dec. 2, 2004

(51) Int. Cl.[7] .............................. H02J 7/00; H02J 7/16
(52) U.S. Cl. ....................... 320/115; 320/107; 320/150
(58) Field of Search ................................ 320/115, 107, 320/150, 104, 112, 113, 114

(56) References Cited

U.S. PATENT DOCUMENTS

| | | | | |
|---|---|---|---|---|
| 5,019,767 A | * | 5/1991 | Shirai et al. | 320/112 |
| 5,730,237 A | * | 3/1998 | Matsuki et al. | 180/65.1 |
| 6,066,938 A | * | 5/2000 | Hyodo et al. | 320/114 |
| 6,218,807 B1 | * | 4/2001 | Sakaue et al. | 320/107 |
| 6,373,228 B1 | * | 4/2002 | Sakakibara | 320/150 |
| 6,377,591 B1 | * | 4/2002 | Hollister et al. | 372/6 |
| 6,455,186 B1 | * | 9/2002 | Moores et al. | 429/71 |
| 6,597,572 B2 | * | 7/2003 | Nishikawa et al. | 361/695 |
| 6,636,016 B2 | * | 10/2003 | Tanaka et al. | 320/107 |
| 2002/0043959 A1 | | 4/2002 | Tanaka et al. | 320/107 |

FOREIGN PATENT DOCUMENTS

| | | |
|---|---|---|
| EP | 0 383 559 A3 | 8/1990 |
| EP | 0 383 559 A2 A3 | 8/1990 |
| EP | 1 100 173 A2 | 5/2001 |

* cited by examiner

*Primary Examiner*—Pia Tibbits
(74) *Attorney, Agent, or Firm*—Stephen M. De Klerk; Blakely, Sokoloff, Taylor & Zafman LLP

(57) ABSTRACT

A battery charger comprising a housing including a compartment for holding battery cells, and an internal electronic charging circuit for charging battery cells in the compartment. A heat sink is located in close proximity to the compartment for physical contact by battery cells being charged to dissipate heat resulting from battery charging. The heat sink is exposed to the outside of the housing for heat dissipation, whereby fast charging is made possible.

12 Claims, 2 Drawing Sheets

US 6,956,354 B2

BATTERY CHARGER

The present invention relates to a battery charger for charging battery cells.

BACKGROUND OF THE INVENTION

The consumer type AA or AAA sized nickel metal-hydride (NiMH) or nickel cadmium (NiCd) rechargeable batteries have widely been in use. Various electrical appliances, such as digital cameras, video recorders, AV equipment, notebook computers, PDAs, cellar phones and toys, require high capacity and reliability AA or AAA sized rechargeable battery cells for operation. There is an ongoing demand for the battery charging time to be as short as possible.

However, a faster charge requires the use of a larger charging current, but a larger current may result in overheating of the batteries. As is known, overheating may damage the battery or reduce its capacity and number of life cycles. In general, a NiMH battery will only have part of its capacity available if the body rises to a temperature over about 60° C. during charging. The life cycle will also be shortened under this condition.

The subject invention seeks to mitigate or at least alleviate such problems by providing an improved battery charger.

SUMMARY OF THE INVENTION

According to the invention, there is provided a battery charger comprising a housing including a compartment for holding battery cells, and an internal electronic charging circuit for charging battery cells in the compartment. A heat sink is located in close proximity to the compartment for physical contact by battery cells being charged to dissipate heat resulting from battery charging. The heat sink is exposed to the outside of the housing for heat dissipation.

Preferably, the heat sink is located immediately behind the compartment.

More preferably, the heat sink has a part that is situated at an outer surface of the housing to dissipate heat.

Further more preferably, the heat sink part occupies an opening of the housing.

Yet further more preferably, the heat sink part lies substantially flush with a wall of the housing bearing the opening.

It is preferred that the heat sink part comprises fins.

In a preferred embodiment, the heat sink has two said parts that are situated at opposite outer surfaces of the housing.

More preferably, each heat sink part comprises fins forming part of and lying substantially flush with the corresponding outer surface.

In a preferred embodiment, the heat sink is located at an inner portion of the compartment.

More preferably, the heat sink defines the inner portion of the compartment.

Further more preferably, the heat sink includes a plurality of substantially parallel part-cylindrical channels at the inner portion of the compartment.

Yet further more preferably, the heat sink has a part situated at an outer surface of the housing for heat dissipation, and one of the channels is provided immediately behind the heat sink part.

Yet further more preferably, the channels have a diameter that is substantially the same as that of said battery cells.

Yet further more preferably, the channels have substantially the same length as said battery cells.

Advantageously, the charging circuit includes a temperature sensor in direct contact with the heat sink.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
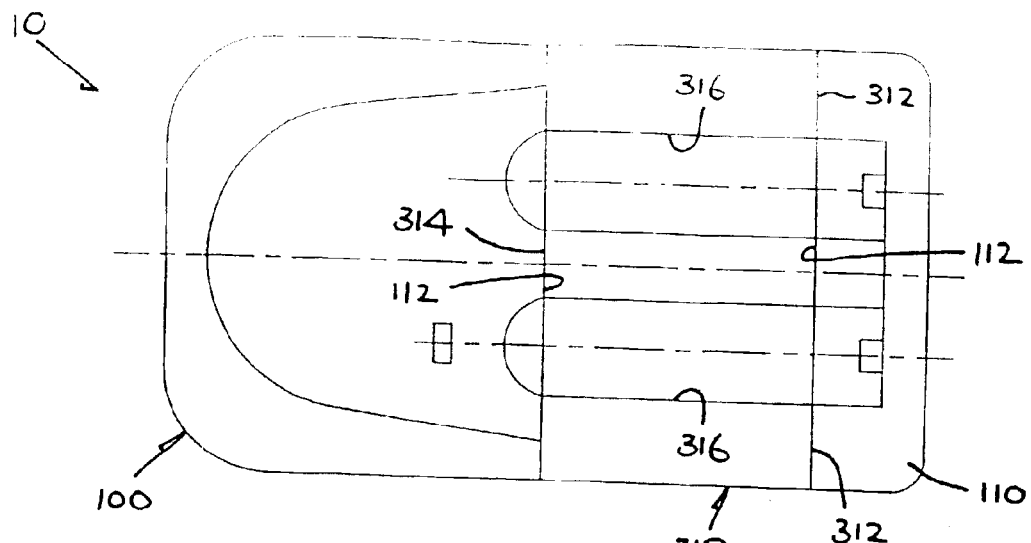
FIG. 1 is a top plan view of an embodiment of a battery charger in accordance with the invention.
Figure 2:
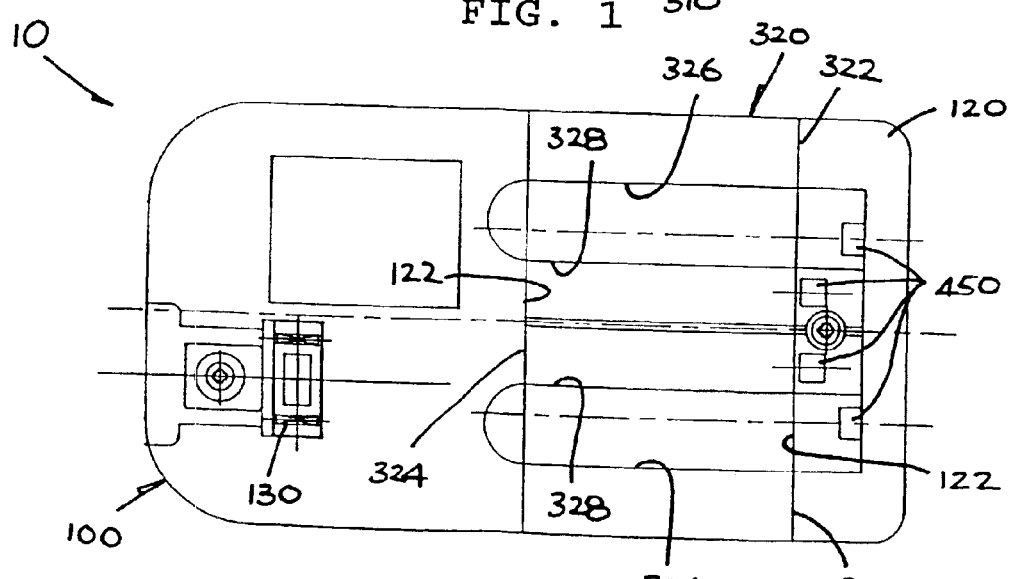
FIG. 2 is a bottom plan view of the battery charger of FIG. 1.
Figure 3:
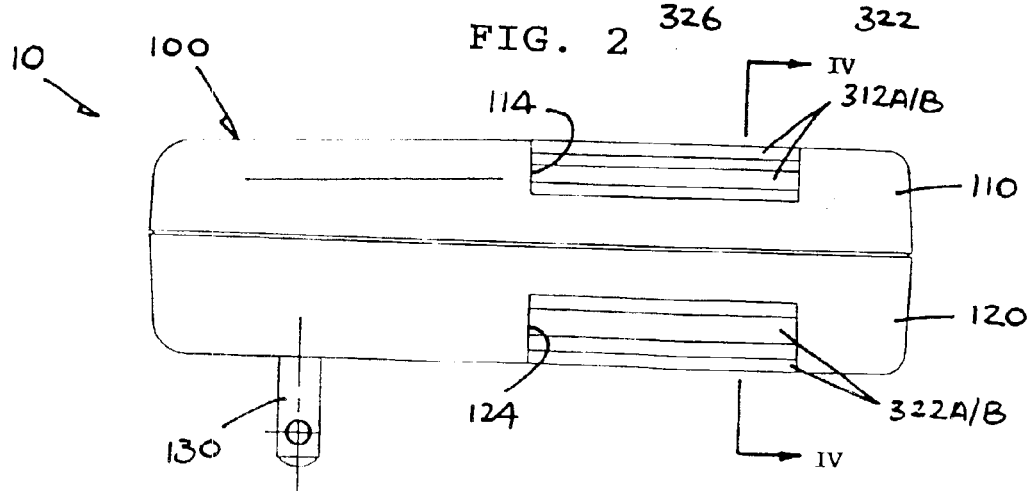
FIG. 3 is a side view of the battery charger of FIG. 1.
Figure 4:
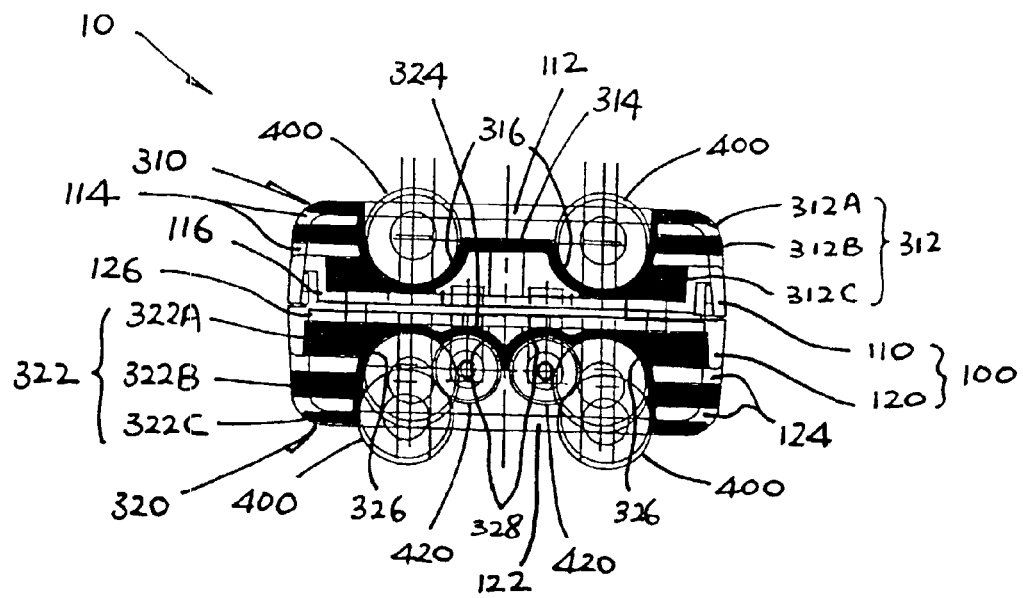
FIG. 4 is a cross-sectional end view of the battery charger of FIG. 3, taken along line IV—IV.
Figure 5:
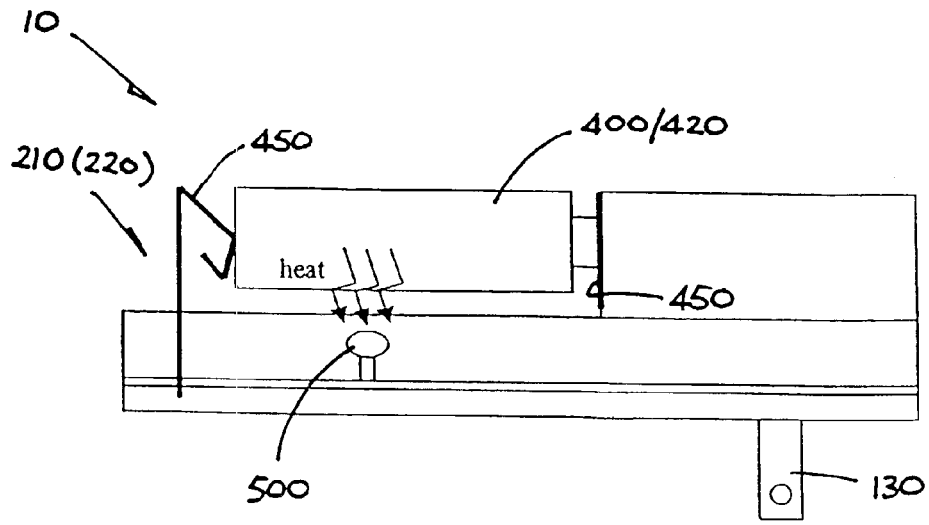
FIG. 5 is a schematic side view of the battery charger of FIG. 1.

Referring to the drawings, there is shown a battery charger 10 embodying the invention, which has a generally flat rectangular housing 100 formed by upper and lower shell-like plastic parts 110 and 120, and an electronic charging circuit (not shown) in the housing 100. Each housing part 110/120 has over its rear end portion a rectangular opening 112/122 which spans transversely across the entire width of the part 110/120 and extends round into left and right walls thereof as respective oblong side openings 114/124. The openings 112 and 122 have the same shape and size and are aligned back-to-back with each other.

The battery housing 100 includes a pair of battery compartments 210 and 220 provided within the housing openings 112 and 122 respectively, each for holding therein two battery cells 400 for charging by the charging circuit. Each compartment 210/220 is defined by a good thermally conducting, aluminum heat sink 310/320 fixed within the corresponding opening 112/122. The heat sink 310/320 is thus located immediately behind and in close proximity to the compartment 210/220, for assisting dissipation of heat generated as a result of charging of the battery cells 400.

Each heat sink 310/320 is manufactured by way of an extrusion process, having a uniform cross-section that is symmetrical as between its left and right sides about a central axis. The heat sink 310/320 has two sets of left and right side cooling fins 312/322 facing outwards on opposite sides of the housing 100. An integral base web 314/324 of the heat sink 310/320 inter-connects the two sets of fins 312/322. Each set has three parallel fins 312/322, i.e. upper, middle and lower fins 312A–312C/322A–322C, with the lower fin 312C/322C connected directly to the corresponding side of the web 314/324.

The cavity as defined between the fins 312/322 and the base web 314/324 of the heat sink 310/320 constitutes the compartment 210/220, having an inner portion defined by the web 314/324. The compartment 210/220 is about deep enough to fully contain the battery cells 400.

The base web 314 of the upper heat sink 310 is shaped to have a pair of generally semi-cylindrical channels 316 which extend parallel to each other and to the fins 312 for locating two AA sized battery cells 400. The channels 316 have a diameter practically the same as, or marginally larger than, that of the battery cells 400 and about the same length for matching them, such that the physical contact area between the cells 400 and the channels 316 is maximized for efficient heat transfer from the former to the latter. For better heat conduction, the two channels 316 lie immediately at the back of the corresponding sets of fins 312, whereby the channels 316 are spaced apart.

The base web 324 of the lower heat sink 320 is also shaped to have a pair of similar channels 326 lying immediately at the back of the corresponding sets of fins 322, except a pair of narrower channels 328 are formed between the two channels 326. The inner channels 328 serve to locate two AAA sized battery cells 420, in place of the AA sized battery cells 400 by the outer channels 326. Likewise for contact area and heat transfer, the inner channels 328 are made to have practically the same diameter as the battery cells 420. On either side, the larger and smaller channels 326 and 328 merge slightly together such that their cross-sections are less than semi-circular.

The two heat sinks 310 and 320 are fixed within the corresponding housing openings 112 and 122, facing in opposite directions, say by rivets to respective back plates 116 and 126 of and interfacing the two housing parts 110 and 120. For either heat sink 310/320, the lower fins 312C/322C are relatively shorter than the others and are concealed by the corresponding housing part 110/120 just below the side openings 114/124.

The upper and middle fins 312A&B/322A&B of each heat sink 310/320 extend outwards and occupy the relevant side openings 114/124, generally matching and lying flush therewith. As these fins 312A&B/322A&B are situated right at the outer surface of the housing 100 and form part of the housing wall bearing the outer surface, they are exposed to the outside of the compartment 210/220 or housing 100 for open heat dissipation.

A pair of electrical contacts 450 is located adjacent opposite ends of each channel 316/326/328 for contacting and holding the battery cells 400/420 in position. The lower housing part 120 supports a pair of folding contact prongs 130 that acts as a power plug for connection to a mains power socket.

The charging circuit will not be described in detail for clarity (as its circuitry is generally known in the art), except that it includes a temperature sensor 500 for control and/or overheating protection. The sensor 500 is mounted in direct contact with both heat sinks 310 and 320 for detecting the temperature of the battery cells 400/420 via the heat sinks 310/320.

Given its high thermal conductivity, the heat sinks 310 and 320 are capable of dissipating the battery heat efficiently and relaying the battery temperature accurately to the charging circuit/sensor 500 without delay.

With the use of a heat sink in a battery charger of the subject invention, as heat can be dissipated quickly, a relatively larger charging current can be used without overheating the batteries, whereby fast charging (in less than 30 minutes) is made possible, within size limitation of the charger.

The subject battery charger may be modified for use with any other sizes of batteries, such as the C and D sized battery cells. It may also be designed for recharging all types of batteries such as those made of NiMH, NiCd or any other materials, either in a battery pack form or single piece form.

The heat sink is made of a high thermal conductivity material, whether of metal or non-metal, for direct contact with the bodies of the batteries, and may be made in any shape, configuration and/or dimension, with or without fins.

The invention has been given by way of example only, and various other modifications and/or variations to the described embodiments may be made by persons skilled in the art without departing from the scope of the invention as specified in the accompanying claims.

What is claimed:

1. A battery charger comprising a housing including a compartment for holding battery cells, an internal electronic charging circuit for charging battery cells in the compartment, and a heat sink, including (i) a web portion defining a plurality of substantially parallel part-cylindrical channels at an inner portion of the compartment, for physical contact by battery cells being charged to dissipate heat resulting from battery charging, and (ii) at least a first plurality of fins connected to the web portion and extending from the web portion away from the part-cylindrical channels, the fins being exposed to the outside of the housing for heat dissipation.

2. The battery charger as claimed in claim 1, wherein the heat sink is located immediately behind the compartment.

3. The battery charger as claimed in claim 2, wherein the web has a part that is situated at an outer surface of the housing to dissipate heat.

4. The battery charger as claimed in claim 3, wherein the part of the web occupies an opening of the housing.

5. The battery charger as claimed in claim 4, wherein the part of the web lies substantially flush with a wall of the housing bearing the opening.

6. The battery charger as claimed in claim 1, wherein the heat sink comprises (iii) a second plurality of fins connected to the web portion and extending from the web portion away from the part-cylindrical channels in a direction that is substantially opposite to the direction that the first set of fins extend from the web portion.

7. The battery charger as claimed in claim 6, wherein the web has first and second parts that are situated at opposite outer surfaces of the housing, the first and second sets of fins extending from the first and second parts of the web, respectively.

8. The battery charger as claimed in claim 7, wherein each set of fins includes one fin lying substantially flush with the corresponding outer surface.

9. The battery charger as claimed in claim 1, wherein at least one of the channels has a diameter that is substantially the same as that of an AA or an AAA battery cell.

10. The battery charger as claimed in claim 9, wherein at least one of the channels has substantially the same length as an AA or an AAA battery cell.

11. The battery charger of claim 1, wherein the part-cylindrical channels include at least first and second channels having first and second radii to accommodate battery cells having the first and second radii, respectively.

12. A battery charger comprising a housing including a compartment for holding battery cells, an internal electronic charging circuit for charging battery cells in the compartment, and a heat sink including (i) a web portion defining a plurality of substantially parallel part-cylindrical channels at an inner portion of the compartment, the part-cylindrical channels including at least first and second channels having first and second radii to accommodate battery cells having the first and second radii, respectively, for physical contact by battery cells being charged to dissipate heat resulting from battery charging, and (ii) the heat sink being exposed to the outside of the housing for heat dissipation.

* * * * *